United States Patent [19]

Asahara et al.

[11] 4,052,481
[45] Oct. 4, 1977

[54] RESIN COMPOSITION AND A PROCESS FOR PREPARING SAME

[75] Inventors: Nakaba Asahara; Yasuhiko Asai; Kenji Yasue, all of Uji, Japan

[73] Assignee: Unitika Ltd., Amagasaki, Japan

[21] Appl. No.: 732,695

[22] Filed: Oct. 14, 1976

[30] Foreign Application Priority Data

Oct. 15, 1975 Japan .............................. 50-124798
Apr. 12, 1976 Japan .............................. 51-41635

[51] Int. Cl.$^2$ ............................................ C08L 77/00
[52] U.S. Cl. ........................... 260/857 PE; 260/47 C; 260/49; 260/857 D
[58] Field of Search ............................... 260/857 PE

[56] References Cited

U.S. PATENT DOCUMENTS

| | | | |
|---|---|---|---|
| 3,522,328 | 7/1970 | Caldwell | 260/857 PE |
| 3,553,288 | 1/1971 | Oda | 260/857 PE |
| 3,658,981 | 4/1972 | Fleming | 260/857 PE |
| 3,758,442 | 9/1973 | Shima | 260/857 PE |

FOREIGN PATENT DOCUMENTS

| | | | |
|---|---|---|---|
| 45-12234 | 4/1970 | Japan | 260/857 PE |

*Primary Examiner*—Paul Lieberman
*Attorney, Agent, or Firm*—Sughrue, Rothwell, Mion, Zinn and Macpeak

[57] ABSTRACT

A resin composition comprising (A) an aromatic copolyester comprising the reaction product in about equimolar amounts of (1) terephthalic acid and/or the functional derivatives thereof, isophthalic acid and/or the functional derivatives thereof and (2) a bisphenol and/or the functional derivatives thereof, (B) a polyamide, and (C) a polyalkylene phenylene ester or a polyalkylene phenylene ester ether, and a process for preparing the same. The resin composition has excellent moldability and the molded articles made therefrom have superior chemical resistance, thermal stability and mechanical properties.

18 Claims, No Drawings

RESIN COMPOSITION AND A PROCESS FOR PREPARING SAME

BACKGROUND OF THE INVENTION

1. Field of the Invention

This invention relates to a resin composition comprising an aromatic copolyester, a polyamide, and a polyalkylene phenylene ester or a polyalkylene phenylene ester ether and a process for preparing the same.

2. Description of the Prior Art

An aromatic copolyester is obtained from a mixture of terephthalic acid and/or the functional derivatives thereof and isophthalic acid and/or the functional derivatives thereof (with the terephthalic acid unit/isophthalic acid unit molar ratio being about 9:1 to about 1:9) and a bisphenol of the following general formula:

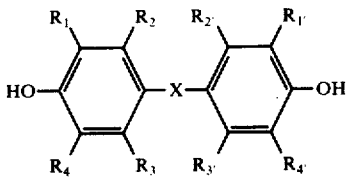

wherein -X- is selected from the group consisting of -O-, -S-, -SO$_2$-, -SO-, -CO-, and alkylene and alkylidene groups containing 1 to 4 carbon atoms, and R$_1$, R$_2$, R$_3$, R$_4$, R$_1'$, R$_2'$, R$_3'$, and R$_4'$ each represents a member selected from the group consisting of a hydrogen atom, a chlorine atom, a bromine atom and alkyl groups containing 1 to 4 carbon atoms, or the functional derivatives thereof.

It is well known that such aromatic copolyesters have many advantageous properties, for example, superior mechanical properties such as tensile strength, bending strength, bending recovery, or impact strength, a high heat distortion temperature, and a high heat decomposition temperature, electrical properties such as inherent resistivity, dielectric breakdown strength, arc resistance or dielectric characteristics, good fire retardancy, good dimensional stability and good solvent resistance. Because of these properties, in general, molded articles, films, fibers and coating materials produced from the aromatic copolyesters by injection molding, extrusion molding, press molding, and other molding techniques are expected to have a wide range of utility.

Despite the above-described advantageous properties and great utilitarian value in industry aromatic copolyesters have the defect of inferior moldability as compared with conventional thermoplastic resins. For example, in the case of injection molding aromatic copolyesters require a higher molding temperature, e.g., about 320° to about 360° C, a higher injection pressure, e.g., about 1,200 to about 1,500 kg/cm², and a higher die temperature, e.g. about 120° to about 140° C, and molded articles made therefrom tend to have sink marks, flow marks, strong internal strain or the like.

Generally, sink marks, flow marks or strong internal strains or the like adversely affect the mechanical properties as well as the appearance of the molded articles to such an extent that the inherent superior properties of the resin cannot be obtained satisfactorily. Also, in some molded articles complete products cannot be obtained because sufficient flow length of the resin used cannot be achieved. In this regard it has hitherto been considered very important requirements in evaluation of engineering plastics (i.e., those plastics which have a superior thermal stability and mechanical strength over polyethylene resins, polypropylene resins, etc., such as polycarbonate resins, polyacetal resins, modified aromatic polyether resins and the like and are useful as materials for various machine parts) that they have many superior properties and especially good moldability.

It is known, however, that the improvement of an engineering plastic in terms of moldability by polymer blending tends to involve the thermal stability of the resin. Also, the improvement of chemical resistance tends to lead to a reduction in heat distortion temperature. Therefore, a resin composition which retains good thermal stability inherent in an engineering plastic and further has good moldability and chemical resistance has long been desired.

In an attempt to improve by polymer blending the moldability of an aromatic copolyester comprising the reaction product of terephthalic acid and isophthalic and and/or functional derivatives thereof and a bisphenol and/or a functional derivative thereof, there has been proposed to blend various resins with the aromatic copolyester. For example, processes using ABS resin (Japanese Patent Application (OPI) 25053/1973), polyethylene terephthalate (Japanese Patent Application (OPI) 23844/1974, U.S. Pat. No. 3,946,091), polyethylene hydroxybenzoate (Japanese Patent Application (OPI) 5443/1975, U.S. Patent 3,884,990), polytetrafluoroethylene (Japanese Patent Application (OPI) 5444/1975), polybutylene terephthalate (Japanese Patent Application (OPI) 34342/1975), a copolymer consisting of ethylene glycol, terephthalic acid and p-hydroxybenzoic acid (Japanese Patent Application (OPI) 64351/1975), an aliphatic polyester or aromatic polyester (Japanese Patent Application (OPI) 96652/1975), etc., are known. These conventional processes, however, have serious defects that the heat distortion temperature and mechanical properties of the aromatic copolyester obtained are reduced greatly.

In preparing a resin composition comprising an aromatic copolyester, a polyamide, and a polyalkylene phenylene ester or a polyalkylene phenylene ester ether, a uniform composition is difficult to obtain using conventional processes wherein melt blending using an extruder is merely applied since the melt viscosity of the aromatic copolyester used is much higher than that of the other components and unmelted aromatic copolyester tends to remain in the resin composition. In the case of extruding the resin composition in the form of, for example, a thin film or a thin monofilament, the presence of unmelted aromatic copolyester can be seen in the appearance thereof; when it is present it damages the appearance of the products badly. Therefore, it has hitherto been desired to improve the above-described disadvantage.

With conventional one step processes for preparing a resin composition comprising an aromatic copolyester, the aromatic copolyester tends to remain unmelted forming heterogeneous regions in the composition and, therefore, a very high temperature is required to obtain a uniformly blended composition. Low melting temperature leads to a non-uniform dispersion of aromatic copolyester and unmelted aromatic copolyester is present in the resulting resin composition. Particularly, when the aromatic copolyester content is not more than 70% by weight based on the total weight of the aromatic copolyester, polyamide and polyalkylene phenylene ester or polyalkylene phenylene ester ether in the blend, the influence of such non-uniform blending is so great that it is very difficult to obtain a resin composition having satisfactory properties using conventional processes. When the content of aromatic copolyester is 50% by weight or less the above tendency is greatly increased.

SUMMARY OF THE INVENTION

An object of this invention is to provide aromatic copolyester compositions having improved moldability.

Another object of this invention is to provide aromatic copolyester compositions having improved chemical resistance.

Still another object of this invention is to provide aromatic copolyester compositions which can be formed into fabricated articles such as monofilaments, films, and various molded articles.

Yet another object of this invention is to provide a process for preparing aromatic copolyester compositions having a uniform resin composition.

These and other objects of this invention will become more apparent as the description of this invention proceeds.

As a result of extensive investigations made to improve the moldability and chemical resistance of an aromatic copolyester obtained from terephthalic acid and isophthalic acid and/or the functional derivatives thereof and a bisphenol and/or the functional derivatives thereof, without deteriorating its thermal stability, it has now been found that a resin composition comprising, in addition to such an aromatic copolyester, a polyamide, and a polyalkylene phenylene ester or a polyalkylene phenylene ester ether has a considerably improved moldability and chemical resistance as compared with such an aromatic copolyester per se, and surprisingly that the resin composition retains substantially the same thermal stability as that of the aromatic copolyester per se, thus achieving this invention.

Accordingly this invention provides a resin composition comprising:

A. 1 to 98.9% by weight of an aromatic copolyester (hereinafter referred to as "PPES," for brevity) comprising the reaction product in about equimolar amounts of (1) terephthalic acid and isophthalic acid and/or the functional derivatives thereof (the terephthalic acid unit/isophthalic acid unit molar ratio being about 9:1 to about 1:9) and (2) a bisphenol of the following general formula:

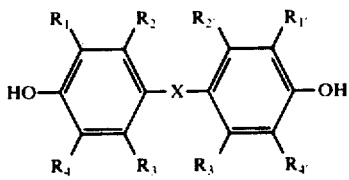

wherein -X- represents a member selected from the group consisting of -O-, -S-, -SO$_2$-, -SO-, -CO-, and alkylene and alkylidene groups containing 1 to 4 carbon atoms, and each of R$_1$, R$_2$, R$_3$, R$_4$, R$_1$', R$_2$', R$_3$' and R$_4$' is selected from the group consisting of a hydrogen atom, a chlorine atom, a bromine atom and alkyl groups containing 1 to 4 carbon atoms, or a derivative thereof, B. 1 to 98.9% by weight of a polyamide (hereinafter referred to as PA, for brevity) of the following general formulae:

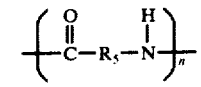

or

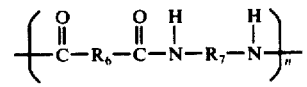

wherein R$_5$, R$_6$ and R$_7$ each represents an alkylene group containing 4 to 11 carbon atoms and n is an integer of from 30 to 500, and C. 0.1 to 98% by weight of a polyalkylene phenylene ester (hereinafter referred to as "PES," for brevity) or a polyalkylene phenylene ester ether (hereinafter referred to as "PEES," for brevity) of the following general formula:

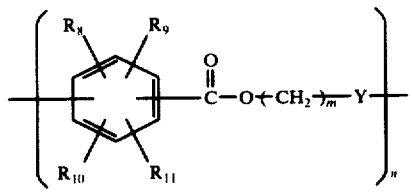

wherein each of R$_8$, R$_9$, R$_{10}$ and R$_{11}$ is selected from the group
wherein each of R$_8$, R$_9$, R$_{10}$ and R$_{11}$ is selected from the group consisting of a hydrogen atom, a chlorine atom, a bromine atom and alkyl groups containing 1 to 4 carbon atoms, m is an integer from 1 to 10 and n is an integer from 30 to 500, and Y is an ester unit or an ether unit.

In the above resin composition each amount of (A), (B) and (C) is expressed in terms of % by weight based on the total weight of (A), (B) and (C), and this expression is used throughout hereinafter.

Surprisingly the ternary composition of this invention has excellent moldability, chemical resistance, thermal stability, and mechanical properties and is most satisfactory as a molding material, although each component per se has various defects as a molding material.

The generally employed process for preparing the aromatic copolyester resin composition of this invention is a melt blending using an extruder wherein the 3 components in predetermined compounding ratios are heated and melt blended to form the resin composition. The thus obtained resin composition can provide molded articles having uniform properties as compared with a simple mixture of powders or pellets of the 3 components resins. However, by merely melt blending using an extruder a uniform composition is difficult to obtain since the melt viscosity of the PPES used is much higher than that of the other components and unmelted PPES tends to remain in the composition.

In an attempt to resolve the above problems we have performed extensive investigations and found a suitable process.

Accordingly this invention also provides a process for preparing a resin composition comprising PPES, PA, and PES or PEES by melt blending which comprises preparing a resin composition containing PPES in a proportion higher than the predetermined amount of the PPES for the resin composition by melt blending (A) PPES with at least one of (B) PA and (C) PES or PEES, then adding to the resulting composition the remainder of (B) PA and/or (C) PES or PEES and further melt blending the thus obtained mixture.

DETAILED DESCRIPTION OF THE INVENTION

The PPES used in this invention is obtained from a mixture of terephthalic acid and isophthalic acid and/or the functional derivatives thereof (the terephthalic acid unit/isophthalic acid unit molar ratio being about 9:1 to about 1:9) and a bisphenol of the following general formula:

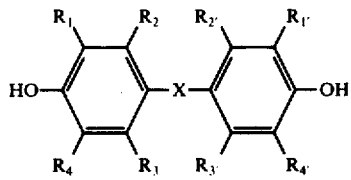

wherein -X- is selected from the group consisting of -O-, -S-, -SO$_2$-, -SO-, -CO-, and alkylene and alkylidene groups containing 1 to 4 carbon atoms, and each of $R_1$, $R_2$, $R_3$, $R_4$, $R_1'$, $R_2'$, $R_3'$ and $R_4'$ is selected from the group consisting of a hydrogen atom, a chlorine atom, a bromine atom and alkyl groups containing 1 to 4 carbon atoms, or a functional derivative thereof.

Suitable examples of alkylene groups for X containing 1 to 4 carbon atoms include a methylene group, an ethylene group, a propylene group, a tetramethylene group, etc. Suitable examples of alkylidene groups for X containing 1 to 4 carbon atoms include an ethylidene group, a propylidene group, an isopropylidene group, an isobutylidene group, etc.

Suitable examples of alkyl groups for $R_1$ to $R_4$ and $R_1'$ to $R_4'$ containing 1 to 4 carbon atoms include a methyl group, an ethyl group, an isopropyl group, a tert-butyl group, etc.

A mixture of about 90 to about 10 mol% of terephthalic acid and/or its functional derivatives and about 10 to about 90 mol% of isophthalic acid and/or its functional derivatives is used as an acid component to be reacted with the bisphenol to prepare the PPES as used in this invention. Preferably, a mixture of 30 to 70 ml% of terephthalic acid and/or its functional derivatives and 70 to 30 mol% of isophthalic acid and/or its functional derivatives is used. PPES prepared from a bisphenol(s) as described above and a mixture of 50 mol% of terephthalic acid and/or its functional derivatives and 50 mol% of isophthalic acid and/or its functional derivatives is most preferred. The molar ratio of the bisphenol(s) to the sum of the terephthalic acid units and isophthalic acid units is substantially equimolar, e.g., about 1:1, preferably 1:1.

Examples of functional derivatives of terephthalic or isophthalic acid which can be used in this invention include acid halides, dialkyl esters and diaryl esters. Preferred examples of acid halides include terephthaloyl dichloride, isophthaloyl dichloride, terephthaloyl dibromide and isophthaloyl dibromide. Preferred examples of dialkyl esters include dialkyl esters of these acids containing 1 to 6 (especially 1 to 2) carbon atoms in each alkyl moiety thereof. Preferred examples of diaryl esters include diphenyl terephthalate, and diphenyl isophthalate.

Examples of the bisphenols of the above formula which can be used are 4,4'-dihydroxy-diphenyl ether, bis(4-hydroxy-2-methylphenyl) ether, bis(4-hydroxy-3-chlorophenyl) ether, bis(4-hydroxyphenyl)sulfide, bis(4-hydroxyphenyl)sulfone, bis(4-hydroxyphenyl)ketone, bis(4-hydroxyphenyl)methane, bis(4-hydroxy-3-methylphenyl)methane, bis(4-hydroxy-3,5-dichlorophenyl)methane, bis(4-hydroxy-3,5-dibromophenol)methane, 1,1-bis(4-hydroxyphenyl)ethane, 2,2-bis(4-hydroxy-3-methylphenyl)propane, 2,2-bis(4-hydroxy-3-chlorophenyl)propane, 2,2-bis(4-hydroxy-3,5-dichlorophenyl)propane, 2,2-bis(4-hydroxy-3,5-dibromophenyl)propane, and 1,1-bis(4-hydroxyphenyl)-n-butane. 2,2-bis(4-hydroxyphenyl)propane, bisphenol A, is most typical and is easily available, and, accordingly, is most often used.

Typical examples of functional derivatives of the bisphenols which can be used are the alkali metal salts and diesters thereof with aliphatic monocarboxylic acids containing 1 to 3 carbon atoms. Suitable examples of aliphatic monocarboxylic acids include formic acid, acetic acid, propionic acid, etc. Preferred functional derivatives of the bisphenols are the sodium salts, the potassium salts, and the diacetate thereof. The bisphenols can be used either individually or as a mixture of two or more thereof.

The PPES of this invention can be prepared by several methods. For example, an interfacial polycondensation can be used in which an aqueous alkaline solution (a pH above about 7 to about 13) of a bisphenol and a terephthaloyl dihalideisophthaloyl dihalide mixture dissolved in a water-immiscible organic solvent are mixed and reacted. Typical interfacial polycondensation procedures are disclosed, for example, in W. M. Eareckson, J. Polymer Sci., XL 399 (1959), and Japanese Patent Publication No. 1959/1965.

According to a typical polycondensation procedure, an aqueous alkaline solution of a bisphenol is added to the terephthaloyl dihalide-isophthaloyl dihalide mixture, preferably a terephthaloyl dichloride-isophthaloyl dichloride mixture, dissolved in an organic solvent, or an organic solvent solution of the terephthaloyl dihalide-isophthaloyl dihalide mixture is added to an aqueous alkaline solution of bisphenol and the system then is polymerized. Alternatively, an aqueous alkaline solution of the bisphenol and a water-immiscible organic solvent solution of the terephthaloyl dihalide-isophthaloyl dihalide mixture can be simultaneously fed into a reaction vessel. Interfacial polycondensation takes place near the interface of the aqueous phase and the organic phase. However, since the aqueous phase and the organic phase are essentially immiscible, it is necessary to mutually disperse the phases; for this purpose, an agitator or a mixer such as a homomixer can be used.

The concentration of the terephthaloyl dihalideisophthaloyl dihalide mixture dissolved in the organic solvent is usually about 2 to about 25% by weight, preferably 3 to 15% by weight. The concentration of the bisphenol in the aqueous alkaline solution is also usually about 2 to about 25% by weight, preferably 3 to 15% by weight.

The amounts of bisphenol and the terephthaloyl dihalideisophthaloyl dihalide mixture are such that the molar ratio between them is preferably maintained equivalent. An excess of the terephthaloyl dihalide-isophthaloyl dihalide mixture is not desirable in the preparation of high molecular weight (e.g., about 1 × 10$^4$) aromatic copolyesters.

Preferred alkalis are sodium hydroxide and potassium hydroxide. The concentration of the alkali in the aqueous solution can vary widely depending upon the reaction conditions, but usually ranges from about 0.5 to about 10% by weight. Advantageously, the quantity of the alkali is nearly equivalent to the hydroxy groups of the bisphenol used or the alkali is present in a slight excess. The preferred molar ratio of the alkali to the hydroxy groups of the bisphenol is about 1:1 to about 1:2, preferably 1:1 to 1:1.1.

Hydrocarbons or halogenated hydrocarbons can be used as water-immiscible organic solvents for the terephthaloyl dihalide-isophthaloyl dihalide mixture. Examples of suitable organic solvents are methylene dichloride, chloroform, tetrachloromethane, 1,2-dichloroethane, 1,1,2-trichloroethane, tetrachloroethane, benzene and methylbenzene. Especially preferred are those solvents which also dissolve the PPES produced. Methylene dichloride is the most preferred solvent.

The reaction temperature is not particularly limited, but usually it is preferably below about 40° C. Reaction temperatures of 5° to 30° C are especially preferred.

The interfacial polymerization is usually performed at normal atmospheric pressure, and is completed in about 1 to 30 hours. A catalyst and a viscosity stabilizer are in general employed. Examples of catalysts which can be used include quaternary ammonium compounds such as trimethyl benzyl ammonium hydroxide, trimethyl benzyl ammonium chloride and triethyl benzyl ammonium chloride, tertiary sulfonium compounds such as dimethyl-2-hydroxyphenyl sulfonium chloride, quaternary phosphonium compounds such as triphenyl methyl phosphonium iodide, and quaternary arsonium compounds such as triphenyl methyl arsonium iodide and trimethyl octyl arsonium iodide. Tertiary amino compounds such as trimethyl amine, triethyl amine and benzyl dimethyl amine can also be used as catalysts. Suitable viscosity stabilizers are, for example, monohydric phenols such as o-phenyl phenol, p-phenyl phenol, m-cresol, p-tert-butyl phenol, 2-phenyl-2-p-hydroxyphenylpropane and β-naphthol. The amount of catalyst used ranges from about 0.01 to about 1 mol% based on the bisphenol and the amount of viscosity stabilizer ranges from about 0.5 to about 5 mol% based on the bisphenol.

If desired, antioxidants and dispersing agents can be added to the aqueous alkaline solution or to the reaction mixture. Typical examples of these additives are given below. Suitable antioxidants include, for example, sodium hydrosulfite and sodium bisulfite. Examples of dispersing agents are anionic surface active agents such as sodium lauryl sulfate and octadecyl benzene sulfonate, cationic surface active agents such as octyl trimethyl ammonium chloride, and nonionic surface active agents such as poly(ethylene oxide).

Another useful method for forming PPES is by melt polymerization as disclosed, for example, in A. Conix, Ind. Eng. Chem., 51, 147 (1959), Japanese Patent Publication 15247/1963 and U.S. Pat. No. 3,395,119.

Melt polymerization can be performed, for example, by reacting an aliphatic carboxylic acid diester of the bisphenol, e.g., as described above, with the terephthalic acid-isophthalic acid mixture at an elevated temperature under reduced pressure. A preferred diester of the bisphenol is the diacetate. Melt polymerization can also be carried out by reacting the bisphenol and a mixture of a diaryl ester of terephthalic acid and isophthalic acid, e.g., as described above, while heating. A typical diaryl ester is the diphenyl ester. The reaction temperature employed is in the range of about 150° to about 350° C, preferably 180° to 320° C. The reaction pressure is usually varied in the course of the reaction from atmospheric pressure at the early stage of the reaction to reduced pressure, for example, below about 0.02 mmHg, toward the end of the reaction. The melt polymerization is completed, in general, in about 2 to about 8 hours.

In melt polymerization, the molar ratio of the bisphenol and the mixture of terephthalic acid-isophthalic acid components to prepare high molecular weight PPES must be maintained exactly equivalent.

A number of catalysts can be used, and preferred catalysts include titanium compounds such as butyl ortho-titanate and titanium dioxide. Other catalysts such as zinc oxide, lead oxide and diantimony trioxide can also be used. The amount of the catalysts generally employed ranged from about $1 \times 10^{-4}$ to $1 \times 10^{-3}$ mol% based on the monomer.

Still another method for forming PPES is solution polymerization in which the PPES is prepared by reacting the bisphenol with the terephthaloyl dihalide and isophthaloyl dihalide in a water-immiscible organic solvent. Useful solution polymerization procedures are disclosed, for example, in A. Conix, Ind. Eng. Chem., 51, 147 (1959), and U.S. Pat. No. 3,133,898.

In solution polymerization, the bisphenol and the mixture of a terephthaloyl dihalide, such as terephthaloyl dichloride, and an isophthaloyl dihalide, such as isophthaloyl dichloride, are usually mixed in equimolar proportions in a water-immiscible organic solvent, and the mixture is gradually heated to high temperatures of, for example, about 220° C. Preferably, the solvent used is one which also dissolves the PPES formed, such as dichloroethylbenzene. Usually, the reaction is carried out in the presence of a base to neutralize the hydrogen halide, for example, hydrogen chloride, formed. Suitable examples of the bases which can be used include a tertiary amine such as trimethylamine, triethylamine, etc., and pyridine.

In order to insure the good physical properties of the aromatic copolyesters used in this invention, they should have a logarithmic viscosity ($\eta_{inh}$), defined by the following equation, of about 0.3 to about 1.0, preferably 0.4 to 0.8.

$$\eta_{inh} = \frac{\log_e t_1/t_2}{C}$$

wherein $t_1$ is the falling time (seconds) of the polymer solution; $t_2$ is the falling time (seconds) of the solvent; and C is the concentration (g/dl) of the polymer in the solution. The logarithmic viscosity, used herein, is determined in a 1,1,2,2-tetrachloroethane-phenol mixture (weight ratio: 4/6) at 25° C.

The PA, one component of the resin composition of this invention, is a compound represented by the following general formulae:

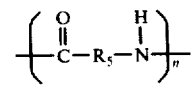

or

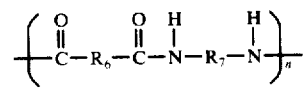

wherein $R_5$, $R_6$ and $R_7$ each represents an alkylene group having 4 to 11 carbon atoms, and n is an integer of 30 to 500.

Suitable examples of alkylene groups containing 4 to 11 carbon atoms for $R_5$ to $R_7$ include a tetramethylene group, a pentamethylene group, a hexamethylene group, a heptamethylene group, an octamethylene group, a nonamethylene group, a decamethylene group, an undecamethylene group, etc.

Any PA which is represented by either of the above general formulae can be used in this invention and there is no further limitation. Preferred examples of the PA include polyhexamethylene adipamide, polycaprolactam, polyhexamethylene sebacamide, polydecamethylene adipamide, polyaminoundecanoic acid, polylaurolactam, etc.

Copolyamides can also be used as the PA in this invention. Examples of suitable copolyamides include a copolyamide derived from caprolactam and hexamethylene adipamide, a copolyamide derived from caprolactam and hexamethylene sebacamide or the like.

The PES and PEES used in this invention are compounds represented by the following general formula:

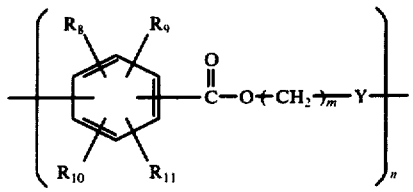

wherein $R_8$, $R_9$, $R_{10}$ and $R_{11}$ each represents a member selected from the group consisting of a hydrogen atom, a chlorine atom, a bromine atom and an alkyl group having 1 to 4 carbon atoms, m is an integer of 1 to 10, n is an integer of 30 to 500, and Y is an ester unit

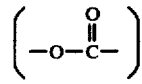

or an ether unit (-O-).

Suitable examples of alkyl groups containing 1 to 4 carbon atoms for $R_8$ to $R_{11}$ include a methyl group, an ethyl group, an isopropyl group, a tert-butyl group, etc.

Examples of suitable PES include polyethylene terephthalate, polyethylene isophthalate, polytrimethylene terephthalate, polytrimethylene isophthalate, polytetramethylene terephthalate, polytetramethylene isophthalate, etc., with polyethylene terephthalate, and polytetramethylene terephthalate being preferred.

Examples of suitable PEES include polyethylene-p-phenylene ester ether, polyethylene-m-phenylene ester ether, polytrimethylene-p-phenylene ester ether, polytrimethylene-m-phenylene ester ether, polytetramethylene-p-phenylene ester ether, polytetramethylene-m-phenylene ester ether, etc., with polyethylene-p-phenylene ester ether being preferred.

The resin composition of this invention is a ternary composition comprising (A) PPES, (B) PA and (C) PES or PEES and thus the properties thereof vary depending on the compounding ratio of each component. A tendency is observed that with increased PPES content the thermal stability of the resin composition is enhanced, that with increased PA content the resin composition has an improved chemical resistance, moldability, and abrasion resistance, and that with increased PES or PEES content the moldability of the composition is improved.

Crazing is observed with molded articles made from PPES alone when they are left to stand in hot water or steam resulting in a considerable reduction in their mechanical properties such as impact strength, etc. The occurrence of crazing can effectively be prevented by the addition of PES or PEES into the PPES. Therefore, freedom from crazing is observed with the resin composition of this invention.

The amount of PES or PEES sufficient to prevent the occurrence of crazing is at least about 0.1% by weight. The resin composition of this invention should contain PPES and PA each in an amount of 1% by weight or more from the standpoint of thermal stability, chemical resistance, moldability and abrasion resistance and, therefore, the resin composition of this invention comprises (A) 1 to 98.9% by weight of PPES, (B) 1 to 98.9% by weight of PA, and (C) 0.1 to 98% by weight of PES or PEES.

The resin composition of this invention exhibits excellent mechanical, chemical, electrical and thermal properties over a wide range of compounding ratios. In order to obtain good moldability, chemical resistance, thermal stability and mechanical properties it is preferred for the resin composition to contain PPES in an amount of 10 to 89.9% by weight, PA in an amount of 10 to 89.9% by weight and PES or PEES in an amount of 0.1 to 80% by weight. A more preferred amount of PPES, PA and PES or PEES is 15 to 84.9% by weight, 15 to 84.9% by weight and 0.1 to 70% by weight, respectively.

Especially good mechanical properties are obtained with a composition comprising 15 to 80% by weight of PPES, 15 to 80% by weight of PA and 5 to 70% by weight of PES or PEES. Further, especially good thermal stability is obtained with a composition of 15 to 84.9% by weight PPES, 15 to 84.9% by weight of PA and 0.1 to less than 5% by weight of PES or PEES, most preferably, 30 to 69.9% by weight of PPES, 30 to 69.9% by weight of PA and 0.1 to less than 5% by weight of PES or PEES.

In order to improve the mechanical properties of the composition according to this invention, one or more other polymers can be added to the resin composition. Particularly, rubbery polymers such as butadiene rubber, butadiene-styrene rubber, butadiene-acrylonitrile rubber, chloroprene rubber, butyl rubber, isoprene rubber, etc., are preferred to improve impact strength and elongation with butadiene-acrylonitrile rubber being most preferred. In adding the above rubbery polymers to the resin composition of this invention greatly improved mechanical properties are obtained by simultaneously adding benzenesulfonylbutyramide to the composition.

To improve the thermal stability of the resin composition of this invention, various thermal stabilizers such as metallic compounds, phosphorus compounds, hindered phenols can be added thereto. When cuprous chloride (or cuprous iodide) and 2-mercaptobenzimidazole are added together to the resin, the most improved thermal stability is obtained.

Various weather resisting agents can be added to the resin composition of this invention to improve the weatherability thereof. Examples of suitable weather resisting agents include benzotriazole derivatives, benzophenone derivatives. Particularly preferred examples of these compounds are 2-(2'-hydroxy-5'-methylphenyl)benzotriazole, 2-(2'-hydroxy-3',5'-di-t-butylphenyl)-5-chlorobenzotriazole, 2-(2'-hydroxy-3'-t-butyl-5'-methylphenyl)-5-chlorobenzotriazole, etc. Usually the weather resisting agent is used in an amount of about 0.01 to about 5% by weight based on the resin composition.

Further, conventional plasticizers, pigments, lubricants and inorganic fillers, such as glass fibers, can also be added to the resin composition of this invention.

Any conventional processes can be used in order to blend the three components to prepare the resin composition of this invention as long as a uniformly mixed composition is obtained.

In the process for preparing a resin composition of this invention, a resin composition containing (A) PPES in a proportion higher than a predetermined amount is prepared by a melt blending process. The resin composition obtained in the first step is not necessarily a ternary system. To the resulting resin composition obtained in the first step, one or more of (B) PA and (C) PES or PEES are added and then melt blended. For example, the total amount of PPES to be used can be melt blended initially with a part of the PA, PES or PEES to be added to the PPES and then the remainder of the PA, PES or PEES is added in the next step to obtain a resin composition having the predetermined compounding component ratios.

It is also possible to add to the PPES a portion of each of the PA, PES or PEES in each of multi-steps and melt blend them. That is, to the resin composition containing PPES in a proportion higher than the predetermined amount which is obtained in a preceding step is added one or more of PA and PES or PEES in the subsequent or a further step and then the mixture is melt blended to prepare a resin composition of desired compounding ratios.

When the PPES content of the desired resin composition is x% by weight based on the total weight of PPES, PA and PES (or PEES), it is preferred that the PPES content in the first melt blending step be about (50 + x/2)% by weight.

Any conventional melt blending process can be used to melt blend the above components.

Heat stabilizers, UV absorbants, antioxidants, plasticizers, pigments, lubricants, fillers or the like additives can be added in any of the steps involved.

In accordance with the multi-step process of the invention, a uniform blending of the resin composition can be obtained by operating any of the subsequent steps at a temperature lower than the first step of conventional processes. Therefore, with the invention the resin obtained is deteriorated to a much lesser extent than one obtained in the conventional one step process despite the fact that in the process of this invention heat histeresis is 2 times or more. This is because the extrusion temperature used in this invention is low. On the contrary, in the conventional processes melt blending must be performed at a temperature as high as possible in order to obtain uniformity in the molded articles. However, a limitation exists with respect to uniformity, since when the temperature is too high the components of the resin composition obtained are deteriorated resulting in a reduction in the various properties of the products. However, with the multi-step process of this invention a uniform resin composition can readily be obtained since it is possible to knead the mixture much more satisfactorily as compared with the conventional one step processes, as earlier described. Further, in accordance with this invention, additives which have rather poor heat stability can be added in the second or a further melt blending step so that there is substantially no limitation with the kind and amount of additives which can be employed, which is in contrast to the conventional one step process.

As described hereinabove, in order to obtain a uniformly blended resin composition having good mechanical properties, the components of the composition are preferably melt blended using an extruder. A particularly preferred process for the above purpose is a process in which the PPES is preliminarily melt blended with PES or PEES using an extruder and the resulting binary resin composition is further melt blended with the PA using an extruder to obtain a desired ternary resin composition.

The resin composition of this invention can be used in the form of powders, chips, etc., which can be then molded into various useful molded articles by press molding, injection molding, extrusion molding and the like using conventional molding processes. Examples of the thus obtained molded articles include gears, bearings, electrical apparatus parts, containers and various other articles which are used widely in those fields where engineering plastics of high quality are required.

The following examples are given to explain this invention in greater detail. These examples should be considered, however, as merely exemplary and non-limting.

Unless otherwise indicated, all parts, percentages and ratios used herein are by weight.

EXAMPLE 1 AND COMPARATIVE EXAMPLES 1 TO 4

A PPES was prepared from 292 kg. of a solution of methylene chloride having dissolved therein 10 kg of terephthaloyl dichloride and 10 kg of isophthaloyl dichloride, and 450 kg of an aqueous alkaline solution of 2,2-bis(4-hydroxyphenyl)propane containing 4 kg of sodium hydroxide and 23 kg of 2,2-bis(4-hydroxyphenyl)propane by interfacial polymerization. The logarithmic viscosity measured in phenol/tetrachloroethane (wt. ratio: 6:4) of the PPES was 0.65.

Powders of the thus obtained PPES and a polycaprolactam (made by Unitika Limited; with the logarithmic viscosity measured in phenol/tetrachloroethane (wt. ratio: 6:4) being 1.06) and a polyethylene terephthalate (made by Nippon Ester Co., Ltd.; with the logarithmic viscosity measured in phenol/tetrachloroethane (wt. ratio: 6:4) being 0.6) each in the amount as set forth in Table 1 below were blended with each other using a super mixer (manufactured by Kawala Seisakusho Co., Ltd.) for 5 minutes.

TABLE 1

Compounding Ratio of the Resin Composition

| Sample No. | Compounding Ratio (parts) | | | Example No. |
| --- | --- | --- | --- | --- |
| | PPES | Polycaprolactam | Polyethylene Terephthalate | |
| 1 | 30 | 50 | 20 | Example 1 |
| 2 | 60 | 0 | 40 | Comparative Example 1 |
| 3 | 30 | 0 | 70 | Comparative Example 2 |
| 4 | 100 | 0 | 0 | Comparative Example 3 |
| 5 | 0 | 100 | 0 | Comparative Example 4 |

Samples Nos. 1 to 4 in Table 1 were dried in vacuo at 100° C for 8 hours and then extruded through an extruder at 300° C for Samples Nos. 1 to 3 and at 320° C for Sample No. 4, respectively, followed by cutting to obtain pellets. The resulting pellets were subjected to spiral molding at a molding temperature of 300° C, a die temperaure of 100° C and an injection pressure of 1,000 kg/cm². The results obtained are shown in Table 2 below.

TABLE 2

| | Spiral Molding Sample Nos. | | | |
|---|---|---|---|---|
| | 1 Example 1 | 2 Comparative Example 1 | 3 Comparative Example 2 | 4 Comparative Example 3 |
| Spiral Length (cm) | 31.3 | 28.4 | 30.1 | 3.0 |

It can be seen from the results shown in Table 2 above that the resin composition of this invention exhibited markedly improved moldability.

Further, the same pellets as used in Example 1 and Comparative Examples 1 to 3 were injection molded under the conditions of a cylinder temperature of 250° C, an injection pressure of 900 kg/cm² and a die temperature of 90° C for Samples Nos. 1 to 3 and a cylinder temperature of 340° C, an injection pressure of 1,400 kg/cm² and a die temperature of 140° C for Sample No. 4, respectively, to obtain S (small) size test samples for a tensile impact test. The S (small) size test samples for tensile impact testing (ASTM D-1822) were supported horizontally by securing at one end of the grabbing portion thereof and treated for 1 hour in a hot air incubator kept at various temperatures as set forth in Table 3 below. The thus treated samples were subjected to heat stability testing wherein deformation of the tip of the other end grabbing portion of the samples due to its weight was determined. The results obtained are shown in Table 3 below.

TABLE 3

| Sample No. | Heat Stability Test Deformation (mm) | | | | | | Example No. |
|---|---|---|---|---|---|---|---|
| | 100° C | 120° C | 140° C | 160° C | 180° C | 200° C | |
| 1 | 0 | 0 | 0 | 0.3 | 0.5 | 0.5 | Example 1 |
| 2 | 0 | 1.5 | 12.0 | — | — | — | Comparative Example 1 |
| 3 | 11.0 | — | — | — | — | — | Comparative Example 2 |
| 4 | 0 | 0 | 0 | 0 | 0 | 1.0 | Comparative Example 3 |

From the results shown in Table 3 above it can be seen that the resin composition of this invention (Sample No. 1) having the same PPES content as Sample No. 3 exhibited superior thermal stability over Sample No. 3. This means that although the resin composition of this invention has a markedly improved moldability, nevertheless it has excellent thermal stability.

Then, test pieces of a size of 4 × 1 × 1/8 (inch) were cut from the molded articles made from pellets of Example 1 and Comparative Examples 1 to 3 and immersed in toluene for 24 hours. Thereafter, these samples were taken out of the toluene and a weight determination and appearance observation were made. The results obtained are shown in Table 4 below.

TABLE 4

| Sample No. | Chemical Resistance Test Change in Weight (%) | Appearance | Example No. |
|---|---|---|---|
| 1 | + 0.1 | No change | Example 1 |
| 2 | +37.4 | Cracks, Swelling | Comparative Example 1 |
| 3 | +11.0 | Swelling | Comparative Example 2 |
| 4 | +56.8 | Swelling | Comparative Example 3 |

From the results shown in Table 4 above, it can be seen that the resin composition of this invention exhibited marked chemical resistance as compared to the compositions of Comparative Examples 1 to 3.

Further, water proof testing was conducted using the same test pieces as used in the above toluene test by immersing them in water for 24 hours. Thereafter, these samples were taken out of the water and a weight determination and appearance observation were made. The results obtained are shown in Table 5 below.

TABLE 5

| Sample No. | Water Proof Test Change in Weight (%) | Appearance | Example No. |
|---|---|---|---|
| 1 | 0.7 | No change | Example 1 |
| 2 | 0.4 | No change | Comparative Example 1 |
| 3 | 0.9 | No change | Comparative Example 2 |
| 4 | 1.6 | No change | Comparative Example 3 |

From the results shown in Table 5 above, it can be seen that the resin composition of this invention (Sample No. 1) exhibited markedly improved water proof property as compared with polycaprolactam per se.

EXAMPLE 2 AND COMPARATIVE EXAMPLES 5 TO 7

A PPES was prepared from 292 kg of a solution of methylene chloride containing 14 kg of terephthaloyl dichloride and 6 kg of isophthaloyl dichloride, and 450 kg of an aqueous alkali solution of 2,2-bis(4-hydroxyphenyl)propane containing 5.6 kg of sodium hydroxide and 32 kg of 2,2-bis(4-hydroxyphenyl)propane by interfacial polymerization. The logarithmic viscosity measured in phenol/tetrachloroethane (wt. ratio: 6:4) of the PPES was 0.70.

Powders of the thus obtained PPES, a polyhexamethylene adipamide (made by E. I. Du Pont de Nemours and Co., Inc.; with the logarithmic viscosity measured in phenol/tetrachloroethane (wt. ratio: 6:4) being 1.35) and a polyethylene-p-phenylene ester ether (made by Eitel Co., Ltd.; with the logarithmic viscosity measured in phenol/tetrachloroethane (wt. ratio: 6:4) being 0.61) each in an amount as set forth in Table 6 were blended with each other in the same manner as in Example 1 to form pellets of a resin composition (at an extrusion temperature of 300° C for Samples Nos. 6 to 8 and of 320° C for Sample No. 9).

TABLE 6

Compounding Ratio of the Resin Composition

| Sample No. | Compounding Ratio (parts) | | | Example No. |
|---|---|---|---|---|
| | PPES | Polyhexa-methylene Adipamide | Polyethylene-p-phenylene Ester Ether | |
| 6 | 40 | 30 | 30 | Example 2 |
| 7 | 40 | 0 | 60 | Comparative Example 5 |
| 8 | 20 | 0 | 80 | Comparative Example 6 |
| 9 | 100 | 0 | 0 | Comparative Example 7 |

Pellets of each of Samples 6 to 9 shown in Table 6 above were obtained and subjected to a spiral molding in the same manner as in Example 1. The results obtained are shown in Table 7 below.

TABLE 7

Spiral Molding

| | Sample No. | | | |
|---|---|---|---|---|
| | 6 Example 2 | 7 Comparative Example 5 | 8 Comparative Example 6 | 9 Comparative Example 7 |
| Spiral Length (cm) | 30.8 | 27.7 | 29.0 | 2.7 |

From the results shown in Table 7 above, it can be seen that the resin composition of this invention (Sample No. 6) exhibited markedly improved moldability as compared with PPES per se.

Heat stability testing was conducted in the same manner as in Example 1 using the above Samples 6 to 9. The results obtained are shown in Table 8 below.

TABLE 8

| Sample No. | Heat Stability Test Deformation (mm) | | | | | | Example No. |
|---|---|---|---|---|---|---|---|
| | 100° C | 120° C | 140° C | 160° C | 180° C | 200° C | |
| 6 | 0 | 0 | 0 | 0.1 | 0.4 | 0.5 | Example 2 |
| 7 | 0 | 0.5 | 5.5 | — | — | — | Comparative Example 5 |
| 8 | 34.0 | — | — | — | — | — | Comparative Example 6 |
| 9 | 0 | 0 | 0 | 0 | 0 | 0.8 | Comparative Example 7 |

From the results shown in Table 8 above, it is apparent that the resin composition of this invention (Sample No. 6) had markedly improved thermal stability as compared with Sample No. 7 which had the same PPES content as Sample No. 6.

Chemical resistance (to toluene) of Samples 6 to 9 shown in Table 6 were determined in the same manner as in Example 1. The results obtained are shown in Table 9 below.

TABLE 9

Chemical Resistance to Toluene

| Sample No. | Change in Weight (%) | Appearance | Example No. |
|---|---|---|---|
| 6 | + 0.1 | No change | Example 2 |
| 7 | +15.0 | Swelling | Comparative Example 5 |
| 8 | + 5.4 | Swelling | Comparative Example 6 |
| 9 | +55.3 | Swelling | Comparative Example 7 |

EXAMPLES 3 TO 5 AND COMPARATIVE EXAMPLES 8 AND 9

A PPES was prepared from 292 kg of a solution of methylene chloride containing 10 kg of terephthaloyl dichloride and 10 kg of isophthaloyl dichloride, and 450 kg of an aqueos alkaline solution of 2,2-bis(4-hydroxyphenyl)propane containing 4 kg of sodium hydroxide and 23 kg of 2,2-bis(4-hydroxyphenyl)propane by interfacial polymerization. The logarithmic viscosity measured in phenol/tetrachloroethane (wt. ratio: 6:4) at 25° C of the PPES was 0.70. The PPES and a polycaprolactam (made by Unitika Limited; with the logarithmic viscosity measured in phenol/tetrachloroethane (wt. ratio: 6:4) being 1.06) and a polyethylene terephthalate (made by Nippon Ester Co., Ltd.; with the logarithmic viscosity measured in phenol/tetrachloroethane (wt. ratio: 6:4) being 0.6) were blended with each other each in the amount as set forth in Table 10 below to prepare resin compositions.

TABLE 10

Compounding Ratio of Resin Composition

| Sample No. | Compounding Ratio (parts) | | | Example No. |
|---|---|---|---|---|
| | PRES | Polycaprolactam | Polyethylene terephthalate | |
| 10 | 49.5 | 49.5 | 1 | Example 3 |
| 11 | 48 | 48 | 4 | Example 4 |
| 12 | 46 | 46 | 8 | Example 5 |
| 13 | 50 | 50 | 0 | Comparative Example 8 |
| 14 | 100 | 0 | 0 | Comparative Example 9 |

Samples Nos. 10 to 13 shown in Table 10 above were dried in vacuo at 100° C for 8 hours and then extruded at 280° C using an extruder to obtain satisfactory pellets. The thus obtained pellets was injection molded under the conditions of a cylinder temperature of 250° C, an injection pressure of 900 kg/cm² and a die temperature of 60° C to form test pieces of a size of 5 × ½ × ⅛ (inch). The test pieces were annealed at 150° C for 2 hours and then their heat distortion temperature was determined.

Also S size test samples for tensile impact testing were prepared using the same pellets and under the same conditions as above. These test samples were subjected to tensile impact testing and the former test samples (⅛ inch thick) were subjected to Izod impact testing. The results obtained are shown in Table 11 below.

TABLE 11

Heat Distortion Temperature and Impact Strength

| Sample No. | Heat Distortion Temperature (° C) | Tesile Impact (kg cm/cm²) | Izod Impact * (kg cm/cm²) | Example No. |
|---|---|---|---|---|
| 10 | 154 | 150 | 7 | Example 3 |
| 11 | 151 | 180 | 8 | Example 4 |
| 12 | 124 | 170 | 6 | Example 5 |
| 13 | 155 | 50 | 3 | Comparative Example 8 |

TABLE 11-continued

Heat Distortion Temperature and Impact Strength

| Sample No. | Heat Distortion Temper. (° C) | Tesile Impact (kg·cm/cm²) | Izod Impact * (kg·cm/cm²) | Example No. |
| --- | --- | --- | --- | --- |
| 14 | 164 | — | — | Comparative Example 9 |

*With notch; ASTM D-256

From the results shown in Table 11 above it can be seen that the heat distortion temperature of Sample No. 12 containing 5% by weight of PPES was much lower than that of the other samples and that samples Nos. 10, 11 and 13 exhibited a heat distortion temperature which was substantially equal to that of Sample No. 14 (164° C) consisting only of PPES. It is also apparent that the resin composition of this invention exhibited very good impact strength as compared with Sample No. 13 containing no PPES.

The pellets shown in Table 10 and pellets of PPES per se (Sample No. 14 comparative Example 9) were subjected to spiral molding under the conditions of a molding temperature of 300° C, a die temperature of 80° C, and an injection pressure of 1,000 kg/cm². The results obtained are shown in Table 12 below.

TABLE 12

Spiral Length

| | Sample No. | | | | |
| --- | --- | --- | --- | --- | --- |
| | 10 Example 3 | 11 Example 4 | 12 Example 5 | 13 Comparative Example 8 | 14 Comparative Example 9 |
| Spiral Length (cm) | 26.2 | 28.7 | 31.0 | 27.3 | 2.2 |

From the results shown in Table 12 above it is apparent that the resin composition of this invention exhibited excellent moldability.

From the injection molded articles made from the various pellets shown in Table 10, test samples of a size of 2 × 1 × ⅛ (inch) were cut and immersed in toluene for 24 hours. Thereafter they were withdrawn from the toluene and a weight determination and observation of the appearance were made. The results obtained are shown in Table 13 below.

TABLE 13

Chemical Resistance Test

| Sample No. | Change in Weight (%) | Appearance | Example No. |
| --- | --- | --- | --- |
| 10 | + 0.15 | No change | Example 3 |
| 11 | + 0.13 | No change | Example 4 |
| 12 | + 0.13 | No change | Example 5 |
| 13 | + 0.16 | No change | Comparative Example 8 |
| 14 | +57.24 | Considerable swelling | Comparative Example 9 |

From the results shown in Table 13 above it can be seen that the resin composition of this invention exhibited a marked improvement in chemical resistance to toluene as compared with PPES per se.

EXAMPLES 6 TO 8 AND COMPARATIVE EXAMPLE 10

The same PPES as used in Examples 3 to 5, a polycoprolactam (made by Unitika Limited; with the logarithmic viscosity measured in phenol/tetrachloroethane (wt. ratio: 6:4) being 1.06), a polyethylene terephthalate (made by Nippon Ester Co., Ltd.; with the logarithmic viscosity measured in phenol/tetrachloroethane (wt. ratio: 6:4) being 0.60), a polytetramethylene terephthalate (made by Mitsubishi Kasei Co., Ltd.; with the logarithmic viscosity measured in phenol/tetrachloroethane (wt. ratio: 6:4) being 0.80) and a polyethylene-p-phenylene ester ether (made by Eitel Co., Ltd.; with the logarithmic viscosity measured in phenol/tetrachloroethane (wt. ratio: 6:4) being 0.61) were blended with each other each in the amount as set forth in Table 14 below. The resulting composition was dried at 100° C for 8 hours and then extruded at 280° C using an extruder. The thus obtained pellets were uniform and satisfactory.

TABLE 14

Compounding Ratio of the Resin Composition

Compounding Ratio (parts)

| Sample No. | PRES | Polycaprolactam | Polyethylene Terephthalate | Polytetramethylene Terephthalate | Polyethylene p-Phenylene Ester Ether | Example No. |
| --- | --- | --- | --- | --- | --- | --- |
| 15 | 49 | 49 | 2 | 0 | 0 | Example 6 |
| 16 | 49 | 49 | 0 | 2 | 0 | Example 7 |
| 17 | 49 | 49 | 0 | 0 | 2 | Example 8 |
| 18 | 50 | 50 | 0 | 0 | 0 | Comparative Example 10 |

Pellets of Samples Nos. 15 to 18 were injection molded under the conditions of a cylinder temperature of 250° C, an injection pressure of 900 kg/cm² and a die temperature of 60° C to form S size test samples for tensile impact testing. The thus obtained test samples were left to stand in an incubator kept at 80° C and RH 95% for 20 days. Then their impact strength was determined. The results obtained are shown in Table 15 below.

TABLE 15

Wet Heat Test
Tesile Impact (kg.cm/cm²)

| Sample No. | Initial | After 20 Days | Retention of Impact Value (%) | Example No. |
| --- | --- | --- | --- | --- |
| 15 | 180 | 120 | 66.7 | Example 6 |
| 16 | 170 | 115 | 67.6 | Example 7 |
| 17 | 180 | 117 | 65.0 | Example 8 |
| 18 | 60 | 15 | 25.0 | Comparative Example 10 |

From the results shown in Table 15 above, it can be seen that the resin composition containing a polyethylene terephthalate, polytetramethylene terephthalate or polyethylene-p-phenylene ester ether exhibited markedly improved resistance to heat and moisture.

EXAMPLES 9 TO 12 AND COMPARATIVE EXAMPLE 11

95 parts by weight of the PPES as used in Examples 3 to 5 was blended with 5 parts by weight of the polyethylene terephthalate as used in Examples 3 to 5 and the resulting mixture was dried in vacuo at 100° C for 8 hours followed by extruding through an extruder at 320° C to form uniform and good pellets (hereinafter referred to as "preblend polymer").

The preblend polymer was blended with pellets of a polycaprolactam in various proportions as set forth in Table 16 below, and the resulting mixture was dried in vacuo at 100° C for 8 hours followed by extruding through an extruder at 260° C to 280° C to form uniform, good pellets.

The thus obtained pellets were injection molded under the conditions of a cylinder temperature of 250° C, an injection pressure of 900 kg/cm², and a die temperature of 60° C to form various test samples. The heat distortion temperature, impact strength and chemical resistance of the resulting test samples were then determined. The results obtained are shown in Table 16 below.

TABLE 17

|  | Extrusion Temperature | | Number of Unmelted | |
|---|---|---|---|---|
|  | 1st Step (° C) | 2nd Step (° C) | PPES per 1m | Appearance |
| Example 13 | 280 | 240 | 0 | Good |
| Comparative Example 12 | 280 | | 101 | Good |
| Comparative Example 13 | 320 | | 60 | Slight burn mark |
| Comparative Example 14 | 350 | | 13 | Decomposed |

From the results shown in Table 17 above, it can be seen that the two step process of this invention did not give rise to unmelted PPES while the conventional one step process was by no means free of unmelted PPES until the extrusion temperature was elevated to the

TABLE 16

| Sample No. | Blend Ratio (wt.ratio) | | Compounding Ratio (parts) | | | Heat Distorsion Temp. (° C) | Impact Strength (kg.cm/cm²) | | Swelling Resistance to Toluene (**) (% change in weight) | Ex. No. |
|---|---|---|---|---|---|---|---|---|---|---|
| | Preblend Polymer | Polycaprolactam | PPES | Polycaprolactam | Polyethylene Terephthalate | | Tensile Impact | Izod Impact(*) | | |
| 19 | 90/10 | | 85.5 | 10 | 4.5 | 158 | 170 | 8 | 48.5 | Ex. 9 |
| 20 | 70/30 | | 66.5 | 30 | 3.5 | 155 | 180 | 7 | 9.5 | Ex. 10 |
| 21 | 50/50 | | 47.5 | 50 | 2.5 | 153 | 180 | 7 | 0.14 | Ex. 11 |
| 22 | 35/65 | | 33.2 | 65 | 1.8 | 130 | 140 | 6 | 0.14 | Ex. 12 |
| 23 | 10/90 | | 9.5 | 90 | 0.5 | 70 | 60 | 3 | 0.12 | Comparative Ex. 11 |

(*) : with notch
(**) : at room temperature for 24 hours.

From the results shown in Table 16 above it can be seen that the resin composition of this invention exhibited superior thermal stability, impact strength and chemical resistance.

EXAMPLE 13 AND COMPARATIVE EXAMPLES 12 to 14

60 parts by weight of the PPES as used in Examples 3 to 5 and 40 parts by weight of a polyethylene terephthalate (made by Unitika Limited; with the logarithmic viscosity measured in phenol/tetrachloroethane (wt. ratio: 6:4) being 0.6) were mixed in the form of powders using a super mixer for 5 minutes and dried in vacuo at 100° C for 8 hours followed by melt blending using an extruder to obtain pellets. The extrusion temperature was 280° C and the screw speed 50 rpm.

50 parts by weight of the pellets obtained in the first step was mixed with 50 parts by weight of a polycaprolactam (made by Unitika Limited; with the logarithmic viscosity measured in phenol/tetrachloroethane (wt. ratio: 6:4) being 1.06) using a super mixer for 5 minutes and the mixture was dried in vacuo at 100° C for 8 hours followed by extruding at 240° C through an extruder. The thus obtaind molten resin composition was molded into a monofilament having a diameter of about 0.5 mm and then the number of unmelted PPES contained in 1 m of the monofilament was determined with the naked eye.

For comparison 30 parts by weight of PPES, 20 parts by weight of polyethylene terephthalate and 50 parts of polycaprolactam were mixed with each other using a super mixer for 5 minutes and the resulting mixture was dried in vacuo at 100° C for 8 hours followed by extruding through an extruder at an extruding temperature of 280° C to 350° C. The results obtained are shown in Table 17 below.

decomposition temperature.

While the invention has been described in detail and with reference to specific embodiments thereof, it will be apparent to one skilled in the art that various changes and modifications can be made therein without departing from the spirit and scope thereof.

What is claimed is:

1. A resin composition comprising:
   A. 1 to 98.9% by weight, based on the resin composition, of an aromatic copolyester comprising the reaction product in about equi-molar amounts of (1) terephthalic acid and isophthalic acid and/or the functional derivatives thereof, wherein the terephthalic acid unit/isophthalic acid unit molar ratio ranges from about 9:1 to about 1:9, and (2) a bisphenol of the following general formula

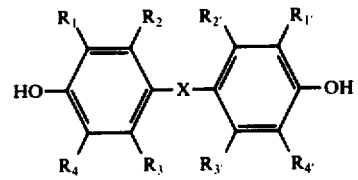

wherein -X- represents a member selected from group consisting of -O-, -S-, -SO$_2$-, -SO-, -CO-, and alkylene and alkylidene groups containing 1 to 4 carbon atoms, and each of R$_1$, R$_2$, R$_3$, R$_4$, R$_1'$, R$_2'$, R$_3'$ and R$_4'$ is selected from the group consisting of a hydrogen atom, a chlorine atom, a bromine atom and an alkyl group containing 1 to 4 carbon atoms, or a derivative thereof;
   B. 1 to 98.9% by weight, based on the resin composition, of a polyamide of the following general formula:

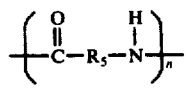

or

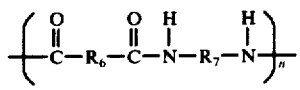

wherein $R_5$, $R_6$ and $R_7$ each represents an alkylene group containing 4 to 11 carbon atoms and n is an integer of from 30 to 500; and C. 0.1 to 98% by weight, based on the resin composition, of a polyalkylene phenylene ester or polyalkylene phenylene ester ether of the following formula:

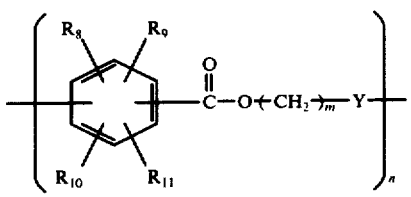

wherein $R_8$, $R_9$, $R_{10}$ and $R_{11}$ each represents a member selected from the group consisting of a hydrogen atom, a chlorine atom, a bromine atom and an alkyl group containing 1 to 4 carbon atoms, m is an integer of from 1 to 10, n is an integer of from 30 to 500, Y is an ester unit or an ether unit.

2. The resin composition as claimed in claim 1, comprising:
A. 10 to 89.9% by weight, based on the resin composition, of said aromatic copolyester;
B. 10 to 89.9% by weight, based on the resin composition, of said polyamide; and
C. 0.1 to 80% by weight, based on the resin composition of said polyalkylene phenylene ester or polyalkylene phenylenic ester ether.

3. The resin composition as claimed in claim 1, comprising:
A. 15 to 84.9% by weight, based on the resin composition, of aid aromatic copolyester;
B. 15 to 84.9% by weight, based on the resin composition, of said polyamide; and
C. 0.1 to 70% by weight, based on the resin composition, of said polyalkylene phenylene ester or polyalkylene phenylene ester ether.

4. The resin composition as claimed in claim 1, comprising:
A. 15 to 80% by weight, based on the resin composition, of said aromatic copolyester;
B. 15 to 80% by weight, based on the resin composition, of said polyamide; and
C. 5 to 70% by weight, based on the resin composition, of said polyalkylene phenylene ester or polyalkylene phenylene ester ether.

5. The resin composition as claimed in claim 1, comprising:
A. 15 to 84.9% by weight, based on the resin composition, of said aromatic copolyester;
B. 15 to 84.9% by weight, based on the resin composition, of said polyamide; and
C. 0.1 to less than 5% by weight, based on the resin composition, of said polyalkylene phenylene ester or polyalkylene phenylene ester ether.

6. The resin composition as claimed in claim 1, comprising:
A. 30 to 69.9% by weight, based on the resin composition, of said aromatic copolyester;
B. 30 to 69.9% by weight, based on the resin composition, of said polyamide; and
C. 0.1 to less than 5% by weight, based on the resin composition, of said polyalkylene phenylene ester or polyalkylene phenylene ester ether.

7. The resin composition as claimed in claim 1, wherein the molar ratio of said terephthalic acid unit-/isophthalic acid unit ranges from 3:7 to 7:3.

8. The resin composition as claimed in claim 1, wherein the molar ratio of said terephthalic acid unit-/isophthalic acid unit is 1:1.

9. The resin composition as claimed in claim 1, wherein said bis-phenol component is 2,2-bis(4-hydroxyphenyl)propane.

10. The resin composition as claimed in claim 1, wherein said polyamide is a polycaprolactam.

11. The resin composition as claimed in claim 1, wherein said polyamide is a polyhexamethylene adipamide.

12. The resin composition as claimed in claim 1, wherein said polyamide is a polyhexamethylene sebacamide.

13. The resin composition as claimed in claim 1, wherein said polyamide is a polyaminoundecnoic acid.

14. The resin composition as claimed in claim 1, wherein said polyamide is a polylaurolactam.

15. The resin composition as claimed in claim 1, wherein said polyalkylene phenylene ester or polyalkylene phenylene ester ether is polyethylene terephthalate.

16. The resin composition as claimed in claim 1, wherein said polyalkylene phenylene ester or polyalkylene phenylene ester ether is a polytetramethylene terephthalate.

17. The resin composition as claimed in claim 1, wherein said polyalkylene phenylene ester or polyalkylene phenylene ester ether is a polyethylene-p-phenylene ester ether.

18. A process for preparing the resin composition as claimed in claim 1, comprising preparing a resin composition containing said aromatic copolyester in a proportion higher than the predetermined amount of said aromatic copolyester for the resin composition by melt blending (A) said aromatic copolyester with at least a portion of at least one of (B) said polyamide and (C) said polyalkylene phenylene ester or said polyalkylene phenylene ester ether, then adding to the resulting composition the remainder of (B) said polyamide and/or (C) said polyalkylene phenylene ester or polyalkylene phenylene ester ether and further melt blending the thus obtained mixture.

* * * * *